(12) United States Patent
Cabib

(10) Patent No.: US 10,337,920 B2
(45) Date of Patent: Jul. 2, 2019

(54) SYSTEM AND METHOD FOR INTERFEROMETRIC BASED SPECTROMETRY AND COMPACT SPECTROMETER USING SAME

(71) Applicant: CI SYSTEMS (ISRAEL) LTD., Migdal Ha'emek (IL)

(72) Inventor: Dario Cabib, Timrat (IL)

(73) Assignee: CI SYSTEMS (ISRAEL) LTD., Migdal Ha'emek (IL)

( * ) Notice: Subject to any disclaimer, the term of this patent is extended or adjusted under 35 U.S.C. 154(b) by 0 days.

(21) Appl. No.: 15/768,548

(22) PCT Filed: Mar. 2, 2017

(86) PCT No.: PCT/IL2017/050266
§ 371 (c)(1),
(2) Date: Apr. 15, 2018

(87) PCT Pub. No.: WO2017/149543
PCT Pub. Date: Sep. 8, 2017

(65) Prior Publication Data
US 2019/0056270 A1 Feb. 21, 2019

Related U.S. Application Data

(60) Provisional application No. 62/318,810, filed on Apr. 6, 2016, provisional application No. 62/302,834, filed on Mar. 3, 2016.

(51) Int. Cl.
*G01J 3/02* (2006.01)
*G01J 3/26* (2006.01)
(Continued)

(52) U.S. Cl.
CPC ............ *G01J 3/45* (2013.01); *G01J 3/0205* (2013.01); *G01J 3/26* (2013.01); *G01J 3/427* (2013.01);
(Continued)

(58) Field of Classification Search
CPC ........ G10H 3/45; G10H 3/427; G10H 3/4338; G01J 2003/425
See application file for complete search history.

(56) References Cited

U.S. PATENT DOCUMENTS

| 5,777,736 A * | 7/1998 | Horton .................... G01J 3/453 356/456 |
| 7,177,020 B2 * | 2/2007 | Morioka ................ B82Y 15/00 356/300 |

(Continued)

*Primary Examiner* — Dominic J Bologna
(74) *Attorney, Agent, or Firm* — Mark M. Friedman

(57) ABSTRACT

An interference fringe pattern generator forms an interference fringe pattern from the light rays diffused from a region of an object positioned against a background. A planar array of detector pixels is arranged to capture an image of the interference fringe pattern. A storage medium records information indicative of intensity values of the image of the interference fringe pattern captured by a selected group of pixels of the planar array of detector pixels. The information is recorded as a function of the optical path difference values traversed by the diffused light rays through the interference fringe pattern generator for each of the pixels in the selected group of pixels. A processor determines the spectral characteristics of the object based on the information indicative of the intensity values recorded by the storage medium and the optical path difference values traversed by the diffused light rays.

22 Claims, 5 Drawing Sheets

(51) Int. Cl.
  *G01J 3/42*   (2006.01)
  *G01J 3/45*   (2006.01)
  *G01J 3/427*  (2006.01)
  *G01J 3/433*  (2006.01)
  *G01J 3/453*  (2006.01)
  *G02B 27/50*  (2006.01)

(52) U.S. Cl.
  CPC ........... *G01J 3/4338* (2013.01); *G01J 3/4531* (2013.01); *G01J 3/4532* (2013.01); *G02B 27/50* (2013.01); *G01J 2003/425* (2013.01)

(56) References Cited

U.S. PATENT DOCUMENTS

| | | | |
|---|---|---|---|
| 2004/0239939 A1* | 12/2004 | Guerineau | G01J 3/0259 356/454 |
| 2005/0051729 A1* | 3/2005 | Chrisp | G01J 3/02 250/339.07 |
| 2007/0279627 A1* | 12/2007 | Tack | G01J 1/42 356/301 |
| 2011/0032530 A1 | 2/2011 | Buisset et al. | |
| 2011/0228279 A1* | 9/2011 | Lucey | G01J 3/26 356/454 |
| 2012/0268745 A1 | 10/2012 | Kudenov | |
| 2015/0268097 A1 | 9/2015 | Ishimaru | |
| 2017/0067821 A1* | 3/2017 | Giles | G01B 9/02044 |

* cited by examiner

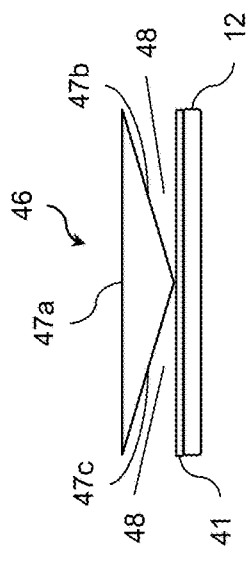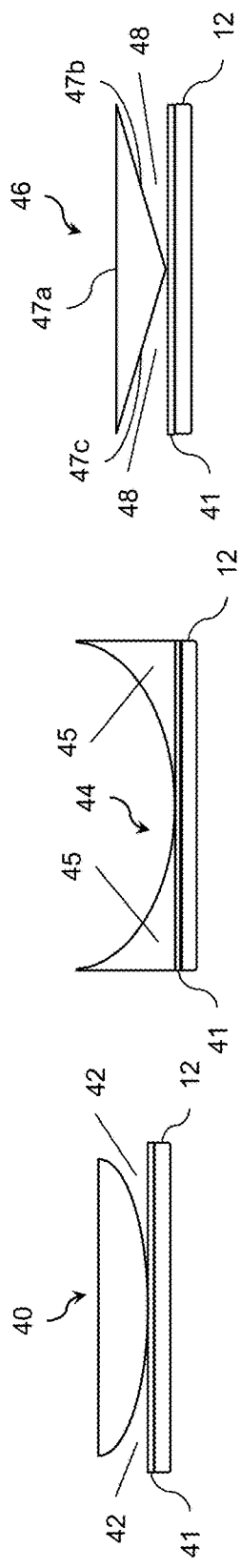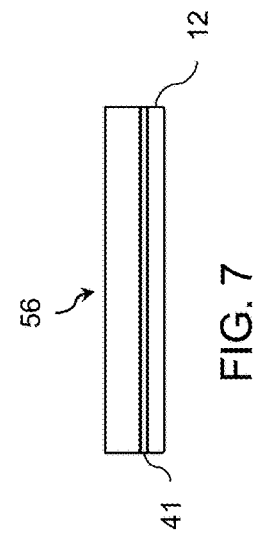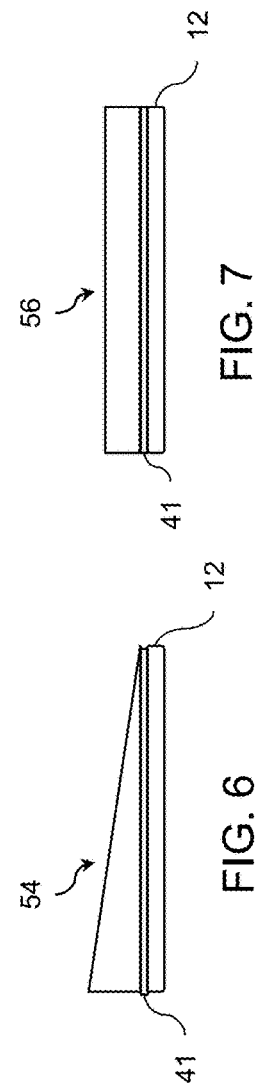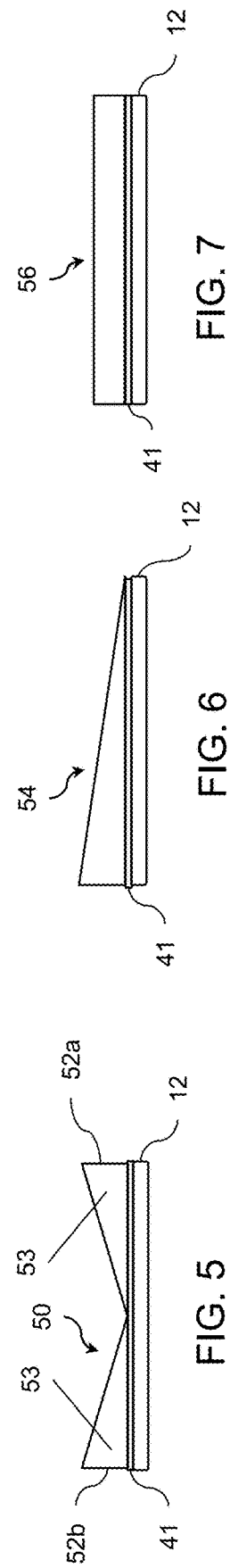

SYSTEM AND METHOD FOR INTERFEROMETRIC BASED SPECTROMETRY AND COMPACT SPECTROMETER USING SAME

TECHNICAL FIELD

The present invention relates to interferometric based spectrometry.

BACKGROUND OF THE INVENTION

Spectrometers are instruments for measuring and/or recording intensity of light as a function of wavelength (or frequency). Spectrometer systems typically include optical components for producing illumination of the object to be studied when measuring its spectral reflectance or transmittance, and may lack such optical components when measuring spectral self-emission of the object. High spectral resolution and sensitive spectrometers for laboratory use enclose the illuminated object in a closed volume, to avoid illumination from uncontrolled background illumination sources, such as room and daylight illumination. For spectrometers designed for recreational daily or semi-daily usage by novice users (i.e., non-experts), the illuminated object may not be enclosed in such a volume, and therefore special consideration should be given to the method of illumination of the object and the process by which the spectral information of the object is extracted.

SUMMARY OF THE INVENTION

The present invention is a system and method for determining the spectral characteristics of an object, and a compact spectrometer, implemented on a detector chip, utilizing the spectral characteristic determination system and method.

According to the teachings of an embodiment of the present invention, there is provided a system comprising: an interference fringe pattern generator to form an interference fringe pattern from light rays diffused by a region of an object positioned against a background, the light rays diffused by the region of the object originating from a focused source having an intensity greater than the illumination intensity of the background; a planar array of detector pixels arranged to capture an image of the interference fringe pattern; a storage medium coupled to the planar array of detector pixels, the storage medium recording information indicative of intensity values of the image of the interference fringe pattern captured by a selected group of pixels of the planar array of detector pixels, the information being recorded as a function of the optical path difference values traversed by the diffused light rays through the interference fringe pattern generator for each of the pixels in the selected group of pixels; and at least one processor coupled to the storage medium to determine the spectral characteristics of the object based on the information indicative of the intensity values recorded by the storage medium and the optical path difference values traversed by the diffused light rays.

Optionally, the interference fringe pattern generator is deployed between the planar array of detector pixels and the object.

Optionally, the interference fringe pattern generator includes: a plano-convex lens having a planar surface parallel to the planar array of detector pixels, the planar surface being a closest surface of the plano-convex lens to the object, and a curved surface being a closest surface of the plano-convex lens to the planar array of detector pixels, and a gap formed in the space between the second and third planar surfaces and the planar array of detector pixels.

Optionally, the interference fringe pattern generator includes: a plano-concave lens, the planar surface of the plano-concave lens being in a plane parallel to the planar array of detector pixels, and being a closest surface of the plano-concave lens to the planar array of detector pixels.

Optionally, the interference fringe pattern generator includes: a prism having a first planar surface parallel to the planar array of detector pixels, the planar surface being a closest surface of the prism to the object, the prism having a second and a third planar surfaces, each extending away from the planar array of detector pixels towards the first planar surface, and a gap formed in the space between the second and third planar surfaces and the planar array of detector pixels.

Optionally, the interference fringe pattern generator includes: a concave prism having a planar surface parallel to the planar array of detector pixels, the planar surface being a closest surface of the prism to the planar array of detector pixels.

Optionally, the interference fringe pattern generator includes: a substantially flat slab parallel to the planar array of detector pixels having a linearly varying index of refraction.

Optionally, the planar array of detector pixels is implemented as a single two-dimensional detector array.

Optionally, the planar array of detector pixels is implemented as one or more linear one-dimensional detector arrays.

Optionally, the interference fringe pattern has circular symmetry.

Optionally, the interference fringe pattern has linear symmetry.

Optionally, the system further comprises: a collimating lens deployed between the interference fringe pattern generator and the object for collimating the light rays diffused by the object.

Optionally, the system further comprises: an illuminator for producing a focused beam of light rays, and the light rays diffused by the region of the object are light rays from the illuminator which are reflected by the object.

Optionally, the light rays diffused by the region of the object are light rays from an illuminator which are reflected by the object, and the system further comprises: a focusing lens for focusing the light rays from the illuminator.

There is also provided according to an embodiment of the teachings of the present invention, a method comprising: deploying an interference fringe pattern generator between a planar array of detector pixels and an object having a region that diffuses light rays to form an interference fringe pattern, the light rays diffused by the region of the object originating from a focused source having an intensity greater than the illumination intensity of a background against which the object is positioned; capturing an image of the interference fringe pattern by the planar array of detector pixels; recording information indicative of intensity values of the image of the interference fringe pattern captured by a first selected group of pixels of the planar array of detector pixels as a function of the optical path difference values traversed by the diffused light rays through the interference fringe pattern generator for each of the pixels in the first selected group of pixels; and determining the spectral characteristics of the object based on the recorded information indicative of the intensity values and the optical path difference values traversed by the diffused light rays.

Optionally, the method further comprises: illuminating the object with a focused beam of light rays, such that, the light rays diffused by the region of the object are light rays from the illuminator which are reflected by the object.

Optionally, the method further comprises: collimating the light rays diffused by the object.

Optionally, the method further comprises: recording intensity values associated with the image of the interference fringe pattern captured by a second selected group of pixels of the planar array of detector pixels as a function of the optical path difference traversed by the diffused light rays through the interference fringe pattern generator for each of the pixels in the second selected group of pixels; and averaging the recorded intensity values associated with the image of the interference fringe pattern captured by the first and second selected groups of pixels.

Optionally, the interference fringe pattern includes a series of concentric rings, and the selected group of pixels of the planar array of detector pixels includes pixels that are arranged in a line which passes through the center of the series of concentric rings.

Optionally, the interference fringe pattern includes a series of substantially parallel lines, and the selected group of pixels of the planar array of detector pixels includes pixels that are arranged in a line substantially perpendicular to the series of substantially parallel lines.

There is also provided according to an embodiment of the teachings of the present invention, a compact spectrometer. The compact spectrometer comprises: a detector integrated circuit having a planar array of detector pixels embedded thereon and an interference fringe pattern generator deposited thereon, the interference fringe pattern generator forming an interference fringe pattern from light rays diffused by a region of an object positioned against a background, the light rays diffused by the region of the object originating from a focused source having an intensity greater than the illumination intensity of the background, and the planar array of detector pixels being arranged to capture an image of the interference fringe pattern; and a processing unit operatively coupled to the planar array of detector pixels, the processing unit including at least one processor coupled to a storage medium, the storage medium recording information indicative of intensity values of the image of the interference fringe pattern captured by a selected group of pixels of the planar array of detector pixels, the information being recorded as a function of the optical path difference values traversed by the diffused light rays through the interference fringe pattern generator for each of the pixels in the selected group of pixels, and the at least one processor to determine the spectral characteristics of the object based on the information indicative of the intensity values recorded by the storage medium and the optical path difference values traversed by the diffused light rays.

Optionally, the processing unit is embedded in the detector integrated circuit.

BRIEF DESCRIPTION OF THE DRAWINGS

The invention is herein described, by way of example only, with reference to the accompanying drawings, wherein:

FIG. 2 is a schematic illustration of an interference fringe pattern generator of the system, implemented as a plano-convex lens positioned on a flat surface, according to an embodiment of the invention;

FIG. 3 is a schematic illustration of an interference fringe pattern generator of the system, implemented as a plano-concave lens, according to an embodiment of the invention;

FIG. 4 is a schematic illustration of an interference fringe pattern generator of the system, implemented as a prism or cone, according to an embodiment of the invention;

FIG. 5 is a schematic illustration of an interference fringe pattern generator of the system, implemented as a concave prism, according to an embodiment of the invention;

FIG. 6 is a schematic illustration of an interference fringe pattern generator of the system, implemented as an asymmetric prism, according to an embodiment of the invention;

FIG. 7 is a schematic illustration of an interference fringe pattern generator of the system, implemented as a slab having a linearly varying index of refraction with gradient parallel to the long side of the slab, according to an embodiment of the invention;

DESCRIPTION OF THE PREFERRED EMBODIMENTS

The present invention is a system and method for determining the spectral characteristics of an object, and a compact spectrometer, implemented on a detector chip, utilizing the spectral characteristic determination system and method.

The principles and operation of the device according to the present invention may be better understood with reference to the drawings and the accompanying description.

The present invention is applicable to various forms of spectrometry and spectroscopy for obtaining and analyzing the spectral characteristics associated with an object (especially in reflection and transmission), and is of particular value when implemented as a small-scale semiconductor based unit suitable for incorporation into digital instruments and devices, such as mobile communication devices (e.g., cellular phones, smart phones, tablets, etc.).

Figure 1:
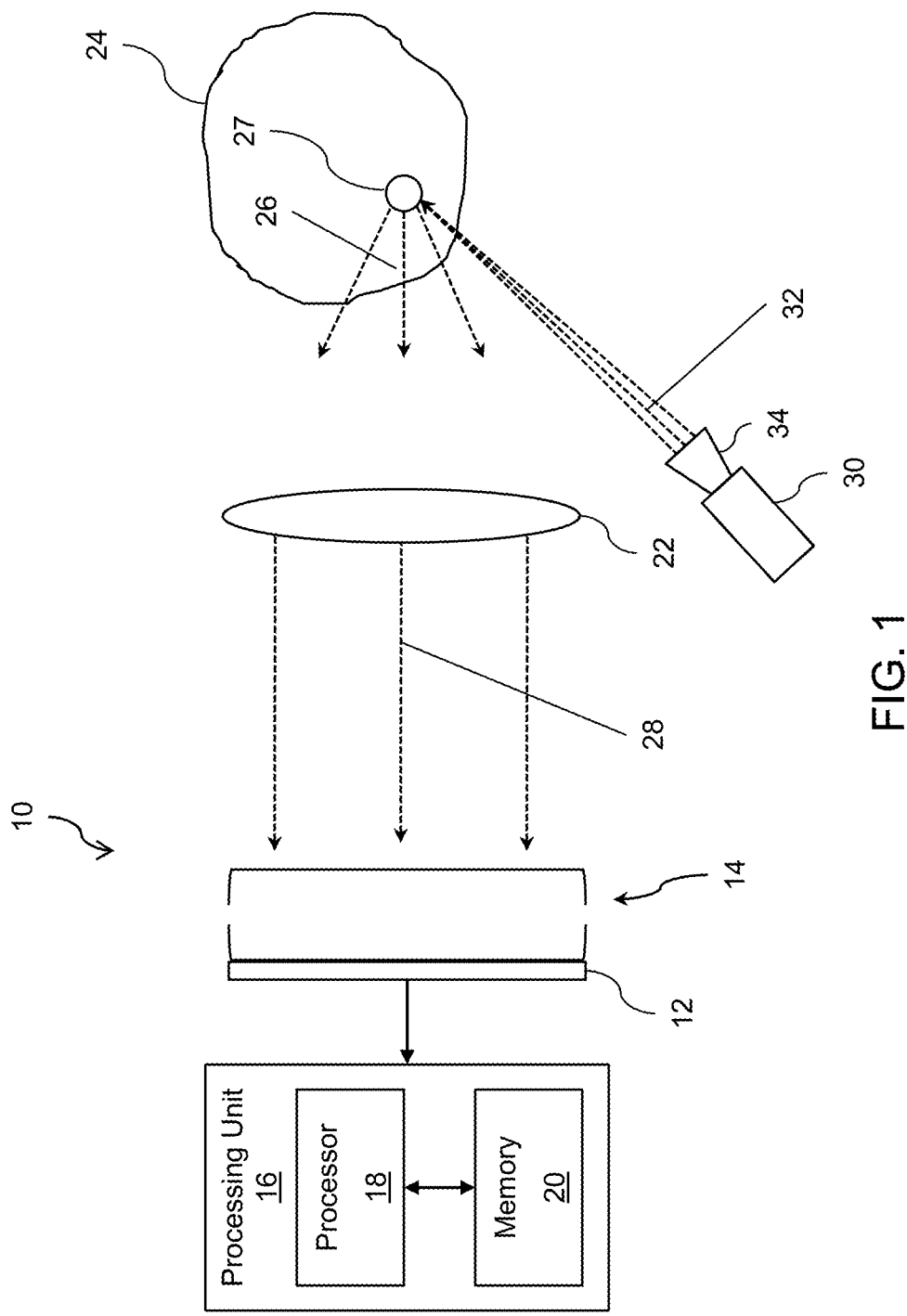
FIG. 1 is a schematic illustration of a system according to an embodiment of the invention.

Referring now to the drawings, FIG. 1 shows schematically a system, generally designated 10, constructed and implemented according to an embodiment of the present invention, for determining the spectral characteristics of an object 24 that diffuses light rays 26 of an intensity some orders of magnitude greater than background illumination. As will be discussed, the light rays 26 may be reflected from focused light rays 32, which are focused on a region 27 of the object 24 (if working in reflection or transmission), or the light rays 26 may be a small and strong light source by itself (if working in self-emission). Generally speaking, the system 10 includes a planar detector array 12, an interference fringe pattern generator 14, and a processing unit 16 that includes at least one processor 18 and a storage medium 20, such as a memory or the like. The interference fringe pattern generator 14 is deployed between the object 24 and the planar detector array 12, and close to the detector array. The interference fringe pattern generator 14 may be implemented in a variety of ways, as will be described in more detail below, and is generically represented in FIG. 1 by open and closed brackets.

The planar detector array 12 may be a two-dimensional detector array formed of M rows and N columns of pixels, resulting in an M×N pixel array. Alternatively, the planar detector array 12 may be formed of one or more linear pixel arrays, with each pixel array consisting of a row or column of N pixels.

The processor 18 can be any number of computer processors including, but not limited to, a microprocessor, an ASIC, a DSP, a state machine, and a microcontroller. Such processors include, or may be in communication with computer readable media, which stores program code or instruction sets that, when executed by the processor, cause the processor to perform actions. Types of computer readable media include, but are not limited to, electronic, optical, magnetic, or other storage or transmission devices capable of providing a processor with computer readable instructions. As should be apparent, all of the components of the processing unit 16 are connected or linked to each other (electronically) either directly or indirectly.

The light rays 26 diffused by the object 24 pass through the interference fringe pattern generator 14, which forms a variable thickness gap with the detector surface, equivalent to a film of variable thickness, that makes the detector surface operate as a wavefront splitter and recombiner of the incoming rays. The variable optical path difference traversed by the two or more coherent wavefronts in different positions on the detector array 12 results in the formation of an interference fringe pattern on the plane of the detector array 12 (i.e., the detector plane). The interference fringe pattern is detected and recorded as a pattern image, and is used to obtain the source spectrum (i.e., spectrum of the region 27 of the object 24) through mathematical transform algorithms.

Note that for a given object size, the angular size of the object 24 as seen from the detector array 12 (i.e., the subtended angle) should not be too large, otherwise the interference fringe pattern is washed out due to loss of coherence of the split wavefronts. In cases where the object 24 is forced to be too close to the interference fringe pattern generator 14, it may be convenient to have an additional collimating lens 22, deployed between the object 24 and the interference fringe pattern generator 14, to limit the subtended angle. In cases where the object 24 is positioned far enough away from the interference fringe pattern generator 14, the collimating lens 22 may not be needed.

The processing unit 16 is electronically coupled to the planar detector array 12 and receives pixel signals from the pixels of the planar detector array 12. Each of the pixel signals is proportional to the intensity values of the image captured by the corresponding pixel. These intensity values are recorded (i.e., stored) by the storage medium 20 as a function of the optical path difference (OPD) through the interference fringe pattern generator 14, traversed by the diffused light rays 26 reaching the specific pixel. The OPD is a function of position on the interference fringe pattern generator 14 and can be derived by the geometry of the interference fringe pattern generator 14 or calibrated by special calibration technique using monochromatic light at a known wavelength. The recorded intensity values and corresponding optical path differences, corresponding to a selected group of pixels of the planar detector array 12, are provided to the processor 18. The processor 18 in turn performs a mathematical transformation on the recorded subset of intensity values, preferably via Fourier Transform techniques (in some cases) or similar transform (in other cases), to obtain the spectral characteristics of the object 24. The resultant spectral characteristics of the object 24 obtained by the processing unit 16 are generally provided in the form of a spectral function that is a wavelength dependent intensity function of the light diffused by the object 24. The process for obtaining the spectral characteristics of the object 24 will be explained in further detail in subsequent sections of the present disclosure.

As mentioned above, the object 24 itself may be a small source of light having a stronger intensity than the background intensity, which produces the light rays 26. As such, the self-emission spectrum of the object 24, may be determined and analyzed by the system 10.

According to certain embodiments, the object 24 may be a sample of material which reflects light when illuminated by an illumination source 30. In such an embodiment, the illumination source 30 produces a focused beam of light rays 32 which are reflected, at least in part, by the object 24, resulting in the light rays 26 diffused by the object 24 being reflected light rays. As such, the reflection spectrum of the object 24 is determined by the system 10. Preferably, the intensity of the light rays 32 produced by the illumination source 30, and the distance between the illumination source 30 and the object 24, are selected to produce a strong and focused illumination spot of the light rays 32 on the object 24. Preferably, a focusing lens 34 is positioned at the output of the illumination source 30, in order to aid in providing the focused illumination spot. As mentioned above, a focused illumination spot allows the formation of an interference fringe pattern which is observable on the detector plane. A strong illumination spot allows the processing unit 16 to largely ignore background illumination, such as daylight illumination, when performing operations to obtain the spectral characteristics of the object 24. Additionally, if the spectrum of the illumination source 30 is known, the spectral light source information can be compensated for by employing normalization and/or calibration algorithms when performing the process for obtaining the quantitative spectral characteristics of the object 24.

The illumination source 30 is preferably operative to produce the light rays 32 in a wavelength range which corresponds to the absorption and emission (i.e., reflection) characteristics of the object 24 (i.e., material under analysis), which may usually be in the ultraviolet (UV), visible and/or infrared ranges. The system 10 may be constructed to operate in different infrared ranges, however subranges of the visible and near infrared ranges (preferably in the range of 400 or 500-1100 nm) are preferable from a cost point of view, since the costs of commercially available detectors and optical materials favor such ranges. As such, the planar detector array 12 is sensitive to, and the interference fringe pattern generator 14 is at least partially transparent to, a wavelength range of the electromagnetic spectrum which corresponds to the wavelength range of the light rays 26, 32. In principle, the planar detector array 12 may be constructed to be sensitive to a wide range of wavelengths, and a bandpass filter may be used to filter the wide range to a narrower wavelength range, if needed.

Note that the schematic illustration of the system 10, as shown in FIG. 1, is not to scale. In fact, in certain non-limiting implementations it is preferable that the illumination source 30 be positioned proximate to the planar detector array 12 and the interference fringe pattern generator 14, which is ideal for incorporation into mobile communication devices, as will be discussed in further detail in subsequent sections of the present disclosure. In practice, in order to properly produce a strong and focused illumination spot of the light rays 32 on the object 24 of an angular size suitable for the required spectral resolution, the components of the system 10 (i.e., the illuminator 30, the planar detector array 12, and the interference fringe pattern generator 14) are preferably positioned approximately 100 mm. from the object 24.

According to certain embodiments, the object 24 may be a sample of material which emits light when illuminated with light in certain wavelength ranges. In a specific application, the system 10 may be suitable to perform Raman Spectroscopy by using the illumination source 30 to focus a beam of blue or UV light on the object 24. In such an embodiment, a blocking filter or filters may be positioned in front of the planar detector array 12 to block the light received directly from the illumination source 30. As is known in the field of fluorescence spectroscopy, the blue or UV light focused on the object 24 causes excitation of the electrons in the molecules of the object 24, which in turn causes emission of light by the object 24 in the form of the light rays 26. It is noted that these light rays 26 are typically in the visible light wavelength range.

For the above applications of reflection and fluorescence spectroscopy, the object 24 may be a sample of material which includes, but is not limited to, various types of tissue (e.g., skin tissue), meat, fruit, vegetables, oils, paints, sugars, soil, and water. Accordingly, the system 10 may be used to advantage to perform composition based analysis, including, but not limited to, skin analysis, tissue analysis, organic materials analysis, paint color analysis, water pollution analysis, pigmentation analysis, material purity analysis, soil analysis, and food sugar content analysis.

As is known in the art, the interference fringe pattern is formed due to the interference of two or more plane waves of coherent light, from the light rays 26, after undergoing reflections at interfaces of spaces or materials of varying thickness and/or varying index of refraction introduced by the interference fringe pattern generator 14. These variations result in the variable optical path difference through which the split light rays 26 travel before interfering with each other. As mentioned above, the interference fringe pattern generator 14 may be implemented in a variety of ways, as will now be discussed.

Refer now to FIG. 2, an implementation of the interference fringe pattern generator 14. In the implementation illustrated in FIG. 2, a slightly curved plano-convex lens 40 is positioned close to the planar detector array 12, such that the plano-convex lens 40 and the planar detector array 12 are touching or nearly touching. Note that between the plano-convex lens 40 and the detector array 12 there may usually be deposited one or more thin and transparent protective layers of dielectric materials 41. These layers of dielectric material 41 are typically dictated by the detector manufacturing process, and do not impair the functionality of the system 10. As such, the layers of dielectric material 41 may be considered as part of the detector array 12. The plano-convex lens 40 is preferably formed from a partially transparent dielectric or synthetic material of index of refraction different than air, and may or may not be coated with a layer of partially reflective material.

The plano-convex lens 40 and the detector array 12 make contact only at the center. At all other points between the plano-convex lens 40 and the detector array 12 there is a gap 42 which increases in radial distance from the center. The top surface of the plano-convex lens 40 is optically flat and in a plane parallel to the detector plane. The top surface is also the closest surface of the interference fringe pattern generator 14 to the object 24, and is consequently the farthest surface of the interference fringe pattern generator 14 from the planar detector array 12.

The light rays 26 impinging on the interference fringe pattern generator 14 traverse through the plano-convex lens 40 and reflect between the detector plane and the bottom surface of the plano-convex lens 40. The interference takes place between the wavefront directly arriving at the detector plane and the wavefronts split by one or multiple reflections between the detector plane and the bottom surface of the plano-convex lens 40. These reflected light rays interfere with each other in a constructive or destructive manner according to the phase change between them, after undergoing different path lengths at the different gap position thickness. As a result, in positions where the path length difference between the reflected rays is an even multiple of half the wavelength of the light waves, the reflected rays interfere constructively, and in the areas where the path length difference between reflected rays is an odd multiple of half the wavelength of the light waves, the reflected rays interfere destructively. Since the thickness of the gap 42 increases radially, a fringe pattern 80 consisting of a series of concentric rings is formed, as illustrated exemplarily in FIG. 8.

Figure 8:
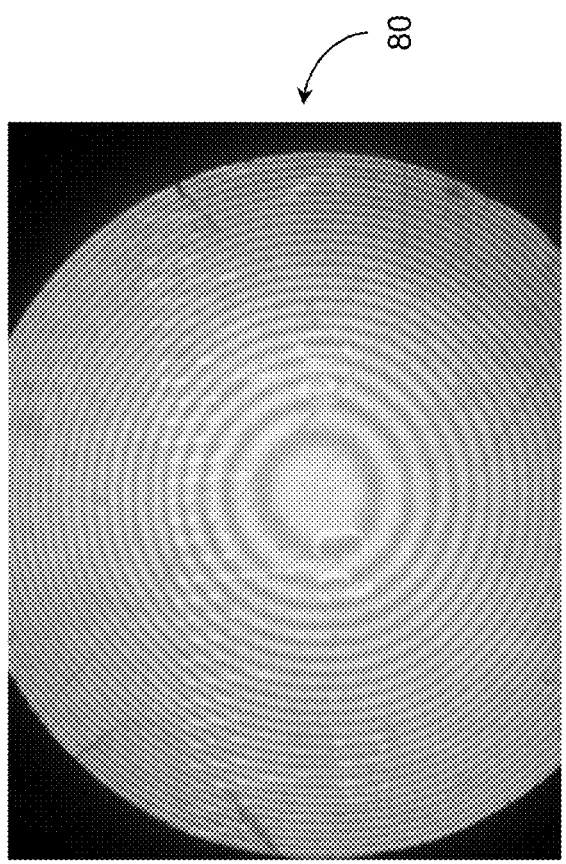
FIG. 8 is an exemplary interference pattern generated by the interference fringe pattern generators of FIG. 2, FIG. 3 and of FIG. 4 when implemented as a cone.

Note that in the illustrated fringe pattern 80 presented in FIG. 8, the fringes are sharp and of a single color in the case of monochromatic illumination, but they are less sharp and of dispersed colors as in a rainbow in the case of white light illumination. The interference fringe pattern has a bright central fringe in transmission.

Figure 10:
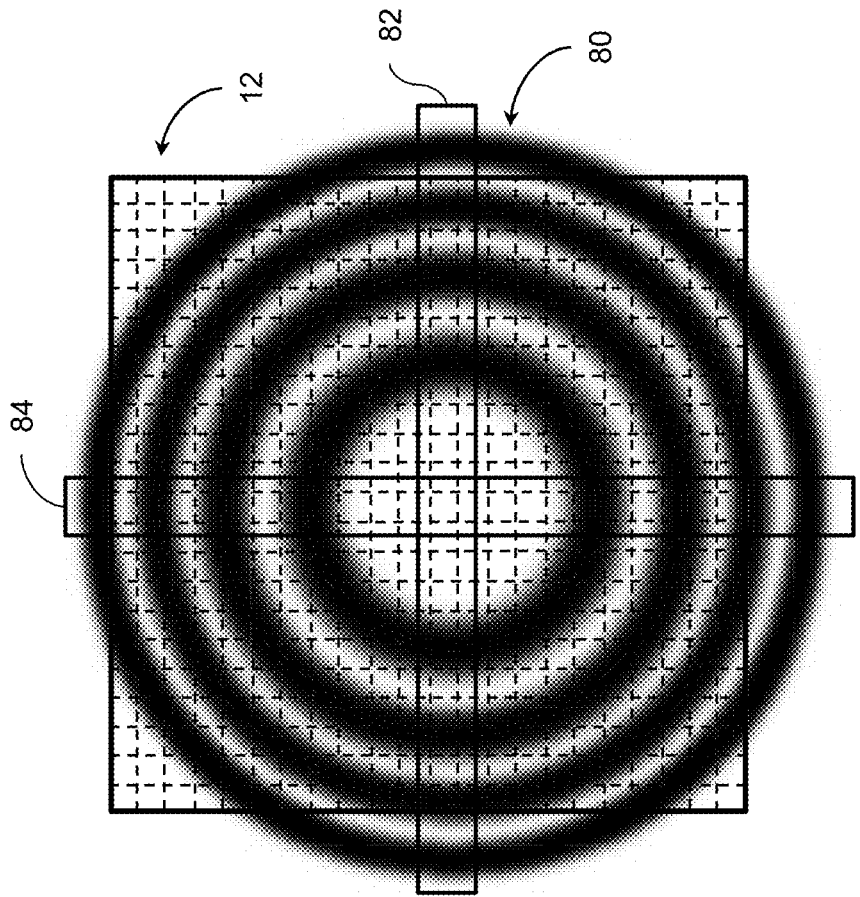
FIG. 10 is a schematic illustration of a schematic illustrative version of the exemplary interference fringe pattern of FIG. 8, superimposed on an array of detector pixels, according to an embodiment of the invention.

Referring to FIG. 10, an illustration of an exemplary deployment of the planar detector array 12 is shown in which the planar detector array 12 is superimposed on a schematic illustrative version of the fringe pattern 80. Note that the illustration of the planar detector array 12 superimposed on the schematic illustrative version of the fringe pattern 80 is not necessarily to scale, and is provided for clarity of illustration. Specifically, the pixels of the detector array 12 must be at least twice as small as the narrowest fringe (i.e., the peripheral fringe).

In the exemplary deployment of FIG. 10, the planar detector array 12 is a two-dimensional M×N detector array (note than M and N may be equal), implemented as, for example, a CCD detector array. Each pixel is preferably square in geometry, however, other geometries are possible, such as, for example, rectangular pixel geometries. As mentioned above, the planar detector array 12 may be formed of one or more linear pixel arrays, with each linear pixel array consisting of a row or column of N pixels. As will be discussed in further detail below, there are advantages to using an M×N pixel array in conjunction with a concentric ring fringe pattern, such as the fringe pattern 80, over a linear pixel array in conjunction with a concentric ring fringe pattern.

As mentioned above, the processing unit 16 performs functions to record and process the information captured by the planar detector array 12 in order to determine the spectral characteristics of the object 24. Each image frame captured by the planar detector array 12 includes an information bearing pixel signal for each pixel, which is proportional to the intensity of light hitting that pixel. In particular, the information carried in the pixel signals includes spectral information, which is carried via the modulation of the signal due to the presence of the fringes.

These pixel signals are stored in the storage medium 20, preferably as digital signals. Note that the pixel signals captured by the planar detector array 12 may be in the form of analog voltage signals detected by the pixel elements of the planar detector array 12, in which case the analog voltage signals are converted, via analog to digital conversion, into digital signals for storage in the storage medium 20. Alternatively, the planar detector array 12 may be configured to provide digital data in the form of digital output signals to the processing unit 16, foregoing the need for analog to digital conversion between the output of the planar detector array 12 and the input to the processing unit 16.

In order to determine the spectral characteristics of the object 24, the information in the pixel signals is recorded in the storage medium 20, and processed by the processor 18, in a specific manner. For each pixel in a subset of pixels, the pixel signal, and accordingly the intensity of light falling on the pixel, is recorded as a function of the optical path difference between the interfering light rays which fall on the pixel. The subset of pixels is selected as a linear group of pixels which cross through the center of the interference fringe pattern, along a diameter of the fringe pattern, such that the group of pixels includes spectral information from each of the fringes of the fringe pattern. Due to the circular symmetry of the fringe pattern 80, each diameter of the fringe pattern 80 carries the same spectral information as any other diameter of the fringe pattern 80, and the area of each of the fringes of the fringe pattern 80 are equal. Note however, that the peripheral fringes carry more spectral information than the central fringes.

As mentioned above, the pixels of the detector array 12 must be at least twice as small as the narrowest fringe (i.e., the peripheral fringe). This condition on pixel size prevents the signal modulation carrying the spectral information from being averaged out.

For the exemplary deployment illustrated in FIG. 10, the linear group of pixels is selected as a line of pixels which pass through the center of the fringe pattern. Two such linear groups of pixels are illustrated in FIG. 10, namely a first group of pixels 82, and a second group of pixels 84. The first group 82 extends across the width of the planar detector arrays 12, and the second group of pixels 84 across the height of the planar detector arrays 12 (perpendicular to the first group 82). As should be apparent, a multitude of additional linear groups of pixels which cross through the center of the interference fringe pattern along different diameters of the fringe pattern are available.

For each pixel in a linear group of pixels, the intensity values of the pixels of light falling on the pixel is recorded as a function of the optical path difference between the interfering light rays which fall on the pixel. This function is referred to as an interferogram. Based on the optical path difference and the recorded intensity, the processor 18 is able to perform an inversion process to obtain the spectrum of light from the object 24. In situations in which the signal contributions from higher-order reflections can be neglected (e.g., due to geometric fall-off at each reflection), the inversion process may be achieved by performing a Fourier Transform on the intensity value function. In situations in which the signal contributions from higher-order reflections cannot be neglected, alternative inversion processes and/or algorithms and/or techniques may be applied, as will be discussed in a subsequent section of the present disclosure. Note that using only a single linear group of pixels (e.g., the first group of pixels 82) for capturing and recording the interferogram is functionally equivalent to using a linear pixel array for capturing and recording the interferogram.

The optical path difference at each recorded intensity value is a direct function of the thickness of the gap 42 corresponding to the position of the particular pixel associated with the recorded intensity value. Specifically, the optical path difference for a given pixel is equal to twice the thickness of the gap 42 at the location of that pixel (if additional reflections are neglected). In other words, for a given pixel p, the optical path difference $L_p$ for pixel p, is equal to $2d_p$, where $d_p$ is the thickness of the gap 42 at the location of pixel p. Since the radius of curvature R of the bottom curved surface of the plano-convex lens 40 is typically much larger than the maximum gap thickness, $L_p$ for pixel p can be approximated as $(r_p)^2/R$, where $r_p$ is the distance of pixel p from the center of the fringe pattern which coincides with the center of the planar detector array 12. Using this general approximation of the optical path difference for each pixel, the interferogram function can be inverted via the above-mentioned inversion process.

Since the individual pixel size of the pixels of the planar detector array 12 are made smaller than the width of the finest (i.e., outermost) fringe, and the central fringes are significantly wider than the outer fringes, the pixel signals from the central fringes are given larger weight than the pixel signals from the peripheral fringes. In fact, since the peripheral fringes carry more spectral information than the central fringes, the larger weight given to the pixel signals from the central fringes creates an inefficiently generated interferogram. This inefficiency is a direct disadvantage of implementing the planar detector array 12 as a linear pixel array.

However, the implementation of the planar detector array 12 as a two-dimensional array can overcome this inefficiency, by capturing the entire concentric ring fringe pattern and appropriately combining the pixel signals, via pixel signal averaging. For example, in the case of the first and second linear groups of pixels 82, 84, the central fringe pixel signals from the pixels of the first group 82 are averaged with the central fringe pixel signals from the pixels of the second group 84. A similar averaging is performed for each concentric ring of the fringe pattern 80. In general, for a given concentric ring of the fringe pattern 80, the pixel signals from the pixels of all the linear groups of pixels which cross through the center of the interference fringe pattern along different diameters of the fringe pattern 80 are averaged together.

As such, the pixel signals of a group of pixels which are the same radial distance from the center of the fringe pattern are averaged together. This process is continued for each radial distance (e.g., $r_p$) of the fringe pattern, creating an average interferogram value for each radial distance and for each OPD (since the OPD is only a function of the radial distance). As discussed above, each average interferogram value is then related to the corresponding OPD between the interfering light rays which fall on the pixels at the given radial distance, and this interferogram function is transformed to yield the spectrum of the object 24. The resultant average interferogram produces a higher signal to noise ratio compared with an interferogram obtained without averaging.

As mentioned above, the gap 42 is a defining feature of the interference fringe pattern generator 14 which allows for the determination of the spectral characteristics of the object 24. An equivalent of the gap 42 may be implemented using a single plano-concave lens 44, as shown in FIG. 3. In the implementation illustrated in FIG. 3, the plano-concave lens 44 is preferably formed from a partially transparent dielectric material, and coated with a layer of partially reflective material.

The plano-concave lens 44 includes an optically flat surface and a generally curved concave surface, in which the optically flat surface of the plano-concave lens 44 is the closest surface of the interference fringe pattern generator 14 to the planar detector array 12, and is consequently the farthest surface of the interference fringe pattern generator 14 from the object 24.

A space 45 between these two surfaces provides the functional equivalent to a gap, and more specifically to the gap illustrated in the example of FIG. 2 in certain implementations of the plano-concave lens 44. The generally curved concave surface of the plano-concave lens 44 may be spherical or cylindrical. When implemented as a spherical surface, the space between the optically flat surface and the spherically concave surface is functionally equivalent to the gap 42 of FIG. 2. As such, when implemented using a spherically concave surface, the plano-concave lens 44 is used to generate the fringe pattern 80 in a manner similar to the plano-convex lens 40.

When implemented as a cylindrical surface, the space between the optically flat surface and the cylindrically concave surface functions as a modified gap which is different from the gap 42 of FIG. 2. As such, when implemented using a cylindrically concave surface, the plano-concave lens 44 is used to generate a non-concentric ring fringe pattern, more specifically a linear fringe pattern. The advantages of using a linear fringe pattern will be discussed in further detail below.

Although using a two-dimensional detector array provides a significant advantage over linear detector arrays, the pairing of any detector array having a Cartesian array of pixels (i.e., either a two-dimensional or linear array) with a concentric ring fringe pattern (such as the fringe pattern generated by the interference fringe pattern generator 14 described with reference to FIGS. 2 and 3) has signal averaging efficiency drawbacks. The above described signal averaging is fundamentally effective only if the size of the individual pixels of detector array are considerably smaller than the width of the finest fringe, which creates a design constraint requiring small pixels. Further, since square and rectangular pixels, typically found in two-dimensional and linear pixel arrays, do not naturally fit the circular symmetry of concentric ring fringe patterns, interpolation and/or manipulation algorithms may be required to assign the appropriate optical path difference value for each pixel signal. Therefore, linear fringe patterns are preferably used versus concentric ring patterns since they have the same Cartesian symmetry as in detector arrays, and in particular two-dimensional detector arrays. Such two-dimensional detector arrays are made of parallel rows of pixels, and therefore the images obtained by such two-dimensional detector arrays are simpler to interpret mathematically.

With continued reference to FIG. 3, refer now to FIGS. 4 and 5, implementations of the interference fringe pattern generator 14 which generate a linear fringe pattern. Note that as mentioned above, the plano-concave lens 44 may also be used to generate a linear fringe pattern when the generally curved concave surface of the plano-concave lens 44 is cylindrical. Note that the plano-convex lens 40 of FIG. 2 may also be used to generate a linear fringe pattern if the curved surface of the plano-convex lens 40 is cylindrical.

In FIG. 4, the interference fringe pattern generator 14 is implemented using a prism 46 which includes planar surfaces. The prism 46 is preferably formed from a partially transparent dielectric material, and coated with a layer of partially reflective material. The prism 46 includes at least three planar surfaces, namely a first planar surface 47a, a second planar surface 47b, and a third planar surface 47c. The first planar surface 47a is parallel to the planar detector array 12, while the second planar surface 47b and the third planar surface 47c extend away from the planar detector array 12 at equal angles and in opposite directions.

Similar to as described above with reference to FIGS. 2 and 3, the prism 46 and the detector array 12 make contact only along the prism ridge line dividing the detector surface into two equal surfaces, where there is no gap. At all other points between the bottom surface of the prism 46 and the detector array 12 there is a gap 48 which increases in size with the distance from the above ridge line. The first planar surface 47a is also the closest surface of the interference fringe pattern generator 14 to the object 24, and is consequently the farthest surface of the interference fringe pattern generator 14 from the planar detector array 12.

The light rays 26 impinging on the interference fringe pattern generator 14 of FIG. 4 traverse through the prism 46, while the planar surfaces 47b, 47c produce reflections between the detector array 12 and the planar surfaces 47b, 47c, forming interference fringes on the detector plane. Similar to the configurations illustrated in FIGS. 2 and 3, in areas where the path length difference between reflected rays is an odd multiple of half the wavelength of the light waves, the reflected waves interfere destructively, and in the areas where the path length difference between reflected rays is an even multiple of half the wavelength of the light waves, the reflected waves interfere constructively.

Figure 9:
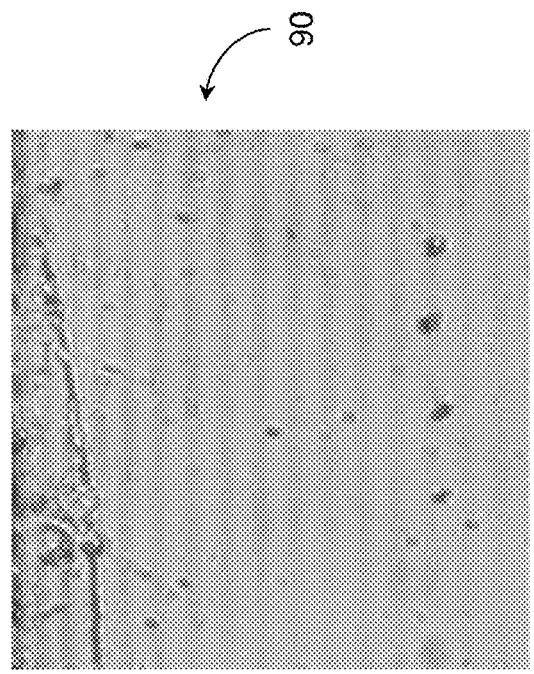
FIG. 9 is an exemplary interference pattern generated by the interference fringe pattern generators of FIGS. 5-7 and of FIG. 4 when implemented as a prism.

In this case, a fringe pattern 90 consisting of a series of straight line parallel fringes are formed, as illustrated exemplarily in FIG. 9. The lines are straight because the fringe lines, being loci of equal gap thickness, are perpendicular to the straight gap thickness gradient lines. When the illumination source is monochromatic, the straight-line fringes are equally spaced. A gap thickness of nearly zero corresponds to a bright fringe. Note that similar to the fringe pattern 80 presented in FIG. 8, the fringes of the fringe pattern 90 are sharp and of a single color in the case of monochromatic illumination, but they are less sharp and of dispersed colors as in a rainbow in the case of white light illumination.

Similar to as described above with reference to FIGS. 2 and 3, the optical path difference $L_p$ for pixel p can be approximated as a function of the thickness of the gap 48, which is a function of the absolute value of the slope of the surfaces 47b, 47c and of the distance ($r_p$) of the pixel position in question from the contact line of the prism 46 with the surface of the detector array 12.

Note that a prism with non-planar surfaces, such as that of a conical solid of revolution, may replace the prism 46 of FIG. 4. However, use of such a conical prism results in a concentric ring fringe pattern, similar to the fringe pattern 80, having the same efficiency drawbacks discussed above.

Figure 11:
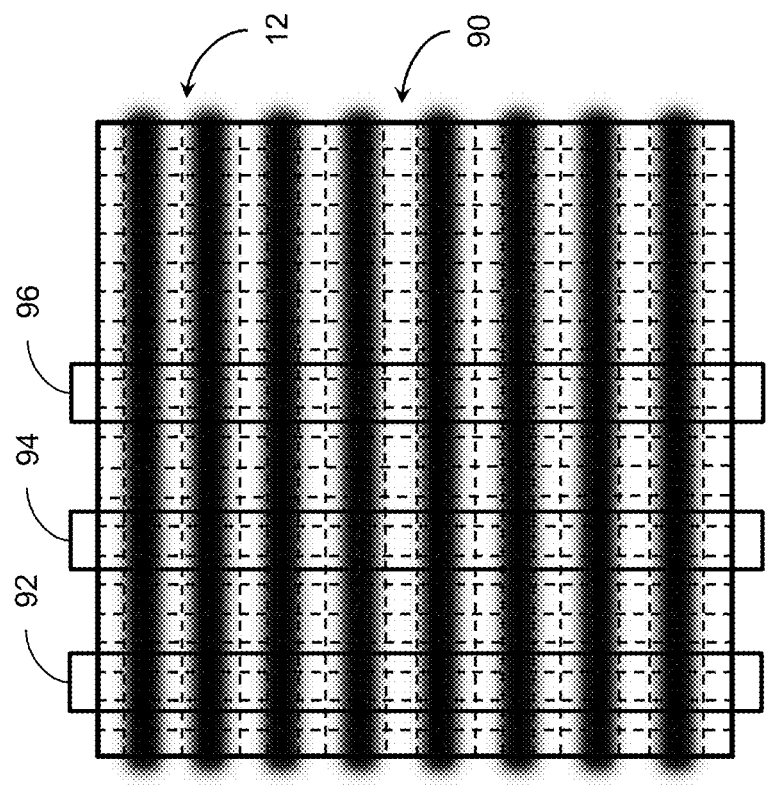
FIG. 11 is a schematic illustration of a schematic illustrative version of the exemplary interference fringe pattern of FIG. 9, superimposed on an array of detector pixels, according to an embodiment of the invention.

Referring to FIG. 11, an illustration of an exemplary deployment of the planar detector array 12 is shown in which the planar detector array 12 is superimposed on a schematic illustrative version of the fringe pattern 90. Similar to as discussed above with reference to FIG. 10, the illustration of the planar detector array 12 superimposed on the schematic illustrative version of the fringe pattern 90 is not necessarily to scale, and is provided for clarity of illustration. Specifically, the pixels of the detector array 12 are typically at least twice as small as the narrowest fringe or smaller.

In the deployment illustrated in FIG. 11, the planar detector array 12 is a two-dimensional M×N detector array, implemented as, for example, a CCD detector array.

Since the planar detector array 12 includes a Cartesian array of equally spaced apart pixels, and lines of the fringe pattern 90 are of equal spacing in monochromatic illumination, the pixel signals from the peripheral fringes are given the same weight as the pixel signals from the other fringes, including the central fringes.

As described above, for each pixel in a subset of pixels, the pixel signal, and accordingly the intensity of light falling on the pixel, is recorded as a function of the optical path difference between the interfering light rays which fall on the pixel. Since the optical path difference gradient is always in a direction perpendicular to the fringe lines direction, an interferogram, being a function of the optical path difference, is obtained by selecting linear groups of pixels crossing perpendicularly to the straight lines of the interference fringe pattern 90. For the exemplary deployment illustrated in FIG. 11, three such linear groups of pixels are illustrated, namely a first group of pixels 92, a second group of pixels 94, and a third group of pixels 96. Each of the groups of pixels 92, 94, 96 extends vertically across the plane of the planar detector array 12, perpendicular to the straight lines of the interference fringe pattern 90. As should be apparent, a multitude of additional linear groups of pixels, which extend vertically across the plane of the planar detector array 12 and perpendicular to the straight lines of the interference fringe pattern 90, are available.

As mentioned above, although each pixel is preferably square in geometry, the pixels may be rectangular in geometry. Note that when using a planar detector array 12 having rectangular pixels in conjunction with a straight-line fringe pattern, similar to the fringe pattern 90, the long side of the pixels should be aligned parallel to the straight lines of the interference fringe pattern in order to prevent the signal modulation carrying the spectral information from being average out.

Similar to the configuration of FIGS. 2 and 3, for each pixel in a linear pixel group, an interferogram, consisting of the intensity values of the pixels of light falling on the pixel, is recorded as a function of the optical path difference between the interfering light rays which fall on the pixel. Based on the optical path difference and the recorded intensity, the processor 18 is able to perform an inversion process to obtain the spectrum of light from the object 24. In situations in which the signal contributions from multiple reflections within the gap 48 can be neglected (e.g., due to geometric fall-off at each reflection) beyond the first reflection, the inversion process may be achieved by performing a Fourier Transform on the intensity value function. In situations in which the signal contributions from multiple reflections cannot be neglected, alternative inversion processes and/or algorithms and/or techniques may be applied, as will be discussed in subsequent sections of the present disclosure.

Similar to as described above with reference to FIGS. 2 and 3, signal averaging techniques may be implemented to increase the overall signal to noise ratio of the captured interferograms. For example, in the case of the three linear groups of pixels 92, 94, 96, the pixel signals from the pixels of the three groups 92, 94, 96 belonging to lines parallel to the fringes are averaged together. The ultimate interferogram is obtained by averaging the signals of each group of pixels belonging to a line parallel to the fringe pattern lines 90. As such, the pixel signals of a group of pixels which are the same linear distance from the center line of the fringe pattern parallel to the fringes are averaged together. This process is continued for each linear distance (e.g., $r_p$) of the fringe pattern 90, creating an average interferogram value for each linear distance and for each OPD (since the OPD is only a function of the linear distance).

Similar to the relationship between FIGS. 2 and 3, an equivalent to the gap 48 of FIG. 4 may be implemented using a single plano-concave prism 50, as shown in FIG. 5. In the implementation illustrated in FIG. 5, the plano-concave prism 50 is preferably formed from a partially transparent dielectric material, and coated with a layer of partially reflective material.

The plano-concave prism 50 has two generally wedge-shaped prism portions, namely a first wedge-shaped portion 52a and a second wedge-shaped portion 52b, each having an optically flat surface. The tapered ends of the two wedge-shaped portions 52a, 52b meet near the planar detector array 12, resulting in a generally v-shaped surface. The optically flat surfaces of the two wedge-shaped portions 52a, 52b form a continuous optically flat surface of the plano-concave prism 50, which is the closest surface of the interference fringe pattern generator 14 to the planar detector array 12, and is consequently the farthest surface of the interference fringe pattern generator 14 from the object 24. A space 53 between these two surfaces provides the functional equivalent to the gap 48. As such, the interference fringe pattern generator 14, when implemented using the plano-concave prism 50, is used to generate a linear fringe pattern, such as the fringe pattern 90.

Note that the two wedge-shaped portions 52a, 52b may be separate members. Therefore, the plano-concave prism 50 may be constructed by placing the separate member wedge-shaped portions 52a, 52b adjacent to each other, with the tapered ends of the separate member wedge-shaped portions 52a, 52b placed at an abutment with each other.

The interference fringe pattern generator 14 may be implemented as a single wedge-shaped prism 54, is illustrated in FIG. 6. The single wedge-shaped prism 54 includes an optically flat surface, being the closest surface of the wedge-shaped prism 54 to the planar detector array 12. The width of the wedge-shaped prism 54 is approximately equal to the width of the planar detector array 12. The wedge-shaped prism 54 has a single tapered end, positioned at one end of the detector array 12.

As mentioned above, the interference fringe patterns are formed due to the interference of two or more plane waves of coherent light, from the light rays 26, after undergoing reflections at interfaces of varying thickness and/or varying index of refraction introduced by the interference fringe pattern generator 14. As such, the interference fringe pattern may be generated by deploying an optically flat slab 56, having a linearly varying index of refraction, proximate to the planar detector array 12. The linear variation of the index of refraction along the length of the slab 56 results in a linear interference fringe pattern, similar to as achieved by the implementations of the interference fringe pattern generator 14 described with reference to FIGS. 4-6.

Note that in principle, the gap 42, 48 of variable thickness, as described above, may be an air gap or a vacuum gap, depending on the construction and the operation of the detector array 12 together with the optical component which forms the variable thickness gap. For example, the detector array 12 and the optical components which forms the variable thickness gap (e.g., the plano-convex lens 40 and the prism 46) are typically retained in a single housing under vacuum, resulting in the gap 42, 48 being a vacuum gap. Alternatively, if the detector array 12 and the optical components which forms the variable thickness gap are kept out of vacuum, the gap 42, 48 is an air gap. Accordingly, the term "gap", "air gap" and "vacuum" gap, as used within the context of this document, may be used interchangeably, and generally refer to the space between the detector array 12 and the optical component used to implement the interference fringe pattern generator 14.

In order to further illustrate the structure and operation of the system 10 of the present disclosure, a numerical example of the selection of parameters of the system 10 will now be presented. Note that the numerical example is a non-limiting example for illustration purposes.

As mentioned above, the system 10 preferably operates in the wavelength range of 400 or 500-1100 nm. In the present non-limiting numerical example, a wavelength range of 400-800 nm is selected, with a desired spectral resolution ($\Delta\lambda$) of 10 nm at a wavelength ($\lambda$) of 800 nm. Accordingly, the spectral resolution in wavenumbers ($\Delta\sigma$) is equal to $\Delta\lambda/\lambda^2$, which gives $10/800^2$ nm$^{-1}$. The maximum optical path difference (OPD$_{max}$) is equal to the reciprocal of $\Delta\sigma$, resulting in OPD$_{max}$ being equal to 64,000 nm (or 64 µm).

In the case in which multiple reflections can be neglected, the maximum thickness (T$_{max}$) of the gap (e.g., the gap 42, 48 in the plano-convex lens 40 and the prism 46) or space (e.g., the space 45, 53 in the plano-concave lens 44, the plano-concave prism 50, etc.) is equal to OPD$_{max}$/2n, where n is the refractive index of the optical component used to implement the interference fringe pattern generator 14. For example, if the interference fringe pattern generator 14 is implemented using the plano-convex lens 40 or the prism 46, the refractive index n is that of air or vacuum space (i.e., n≈1). If the interference fringe pattern generator 14 is implemented using any of the components described with reference to FIGS. 3 and 5-7, the refractive index n is the index of refraction of the material used for constructing the optical component used to implement the interference fringe pattern generator 14.

If the gap or space thickness reaches zero (for example in the center of the detector array 12 as in FIG. 5) or much less than one wavelength, the fringe pattern includes a central bright fringe, which corresponds to an optical path difference of zero. While the pixel signals from the central bright fringe may contribute to verification of the linear performance of the detector array 12, the spectral information contained in the central bright fringe may be negligible. Therefore, the performance of the system 10 may not be compromised if the central fringe is absent from the fringe pattern. This may be accomplished by forcing the minimum optical path difference (OPD$_{min}$) to be equal to the minimum wavelength ($\lambda_{min}$). Further, manufacturing of the detector array 12 and interference fringe pattern generator 14 may result in difficulty in producing a zero or near-zero gap thickness. Therefore, the minimum thickness (T$_{min}$) of the gap (e.g., the gap 42, 48) or space (e.g., the space 45, 53) should introduce an optical path difference of at least one wavelength. As such, T$_{mm}$ is equal to $\lambda_{min}/2n$, which, according to the above value of 400 nm for $\lambda_{min}$ yields 400/2n nm.

In addition to determining the minimum and maximum optical path difference for a desired spectral resolution, the number of pixel elements of the detector array 12 may also be selected based on the optical path difference values. Specifically, the change in optical path difference between neighboring pixels ($\Delta$OPD) is equal to OPD$_{max}$/(M/2), where M is the number of rows of the detector array 12 when implemented as an M×N pixel array. Using the above obtained value of 64 µm for OPD$_{max}$, $\Delta$OPD is equal to 128/M µm. In general, in order to satisfy the Nyquist sampling condition, $\Delta$OPD should be less than half of the minimum wavelength. Based on the above value of 400 nm for $\lambda_{min}$, $\Delta$OPD should not exceed 400/2 nm, or 200 nm. As such, if M is on the order of 1000, $\Delta$OPD is ~128/1000 µm, yielding $\Delta$OPD of ~128 nm, which satisfies the Nyquist sampling condition.

As discussed above, the processing unit 16 performs operations to record interferograms as a function of optical path difference, and subsequently transform (e.g., Fourier Transform when multiple reflections can be neglected) the recorded interferograms to obtain the spectral characteristics of the object 24. The interferogram function (i.e., intensity function), in the case of monochromatic light and multiple reflections, can be generally expressed by the following equation:

$$s(g) = \frac{1}{1 + F^2\sin^2(g/2)}$$

where F=2K/(1−K) and g=2πL/λ, in which L is the optical path difference, λ is the wavelength of the light under consideration by the system 10, and K is the reflectivity of the component surfaces used to implement the interference fringe pattern generator 14. As mentioned above, since the optical components (e.g., the plano-convex lens 40, the plano-concave lens 44, the prism 46, the plano-concave prism 50, etc.) are coated with a layer of partially reflective material, the reflectivity K can be selected according to design requirements.

In the case of broad-band light, the interferogram function results from the linear superposition of the above s(g) functions, when the value of s at each wavelength is weighted by the source intensity at that wavelength. Accordingly, when the interferogram is produced by the s(g) function above instead of a trigonometric function (e.g., in the case of a Michelson interferometer), a different transformation from the Fourier Transform should be used to calculate the source spectrum. In fact, for example, if a discrete matrix S is constructed using the s(g) function above for the values of L and λ in the appropriate range, the spectrum (defined as a vector in λ space), can be found by inverting the matrix S and multiplying it by the interferogram (defined as a vector in the L space).

Figure 12:
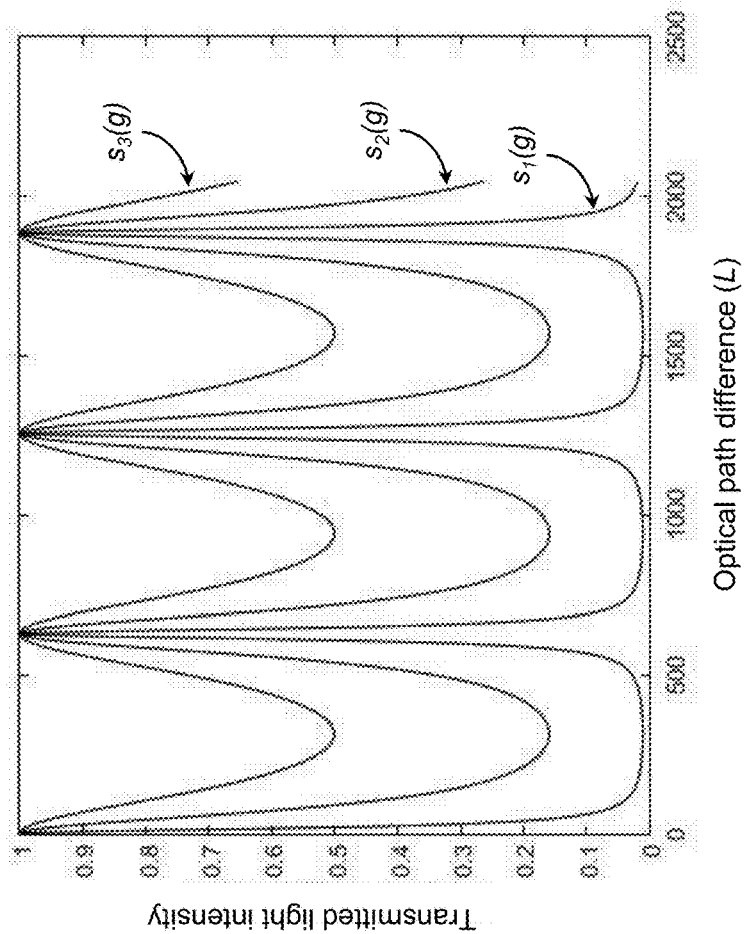
FIG. 12 is a plot of interferograms for examples of three different reflectivity values of the surfaces of an interference fringe pattern generator, according to an embodiment of the invention.

Consideration for the selection of the reflectivity K is now presented. Refer now to FIG. 12, plots of interferograms in transmission for examples of three different reflectivity values using an interference fringe pattern generator which produces linear fringes (e.g., the fringe pattern 90) being equally spaced. In FIG. 12 the light is monochromatic and the units of L are such that the maxima and minima positions correspond to the constructive and destructive interference. These maxima and minima positions shift accordingly for different wavelengths.

The first interferogram s$_1$(g) has the narrowest fringes and highest contrast between maximum and minimum intensity, and is therefore suitable for monochromatic or high resolution spectral analysis. The second interferogram s$_2$(g) has a medium contrast between maximum and minimum intensity and approximately a sinusoidal curve shape, making the second interferogram $s_2(g)$ suitable for medium resolution spectral analysis. The third interferogram $s_3(g)$ has the lowest contrast between maximum and minimum intensity and a more sinusoidal curve shape.

In the example illustrated in FIG. 12, the optimum value for F, which provides the highest ratio between the nearly sinusoidal component of the interferogram and the background illumination (the dc baseline of the curve), is approximately 2.3, which corresponds to a reflectivity K value of approximately 0.66. In the example illustrated in FIG. 12, this optimum value for F corresponds to the second interferogram $s_2(g)$, which is therefore the most suitable interferogram for performing spectral analysis of the object 24 at medium spectral resolution, which can be achieved by taking the Fourier Transform (or similar transform) of $s_2(g)$. Note that appropriate selection of the reflectivity K ensures that the energy of the interference fringe pattern is well distributed throughout the pixels of the planar detector array 12, and that the intensity of the fringes varies smoothly from pixel to pixel.

As mentioned above, the system of the present disclosure is of particular value when implemented as a small-scale compact spectrometry unit suitable for incorporation into digital instruments and devices, such as mobile communication devices (e.g., cellular phones, smart phones, tablets, etc.). The implementations of the interference fringe pattern generator 14 described above, specifically with reference to FIGS. 3-7, are advantageously suitable in semiconductor manufacturing methods, and therefore may be more easily manufactured on a small-scale for use in such a compact spectrometry system.

Figure 13:
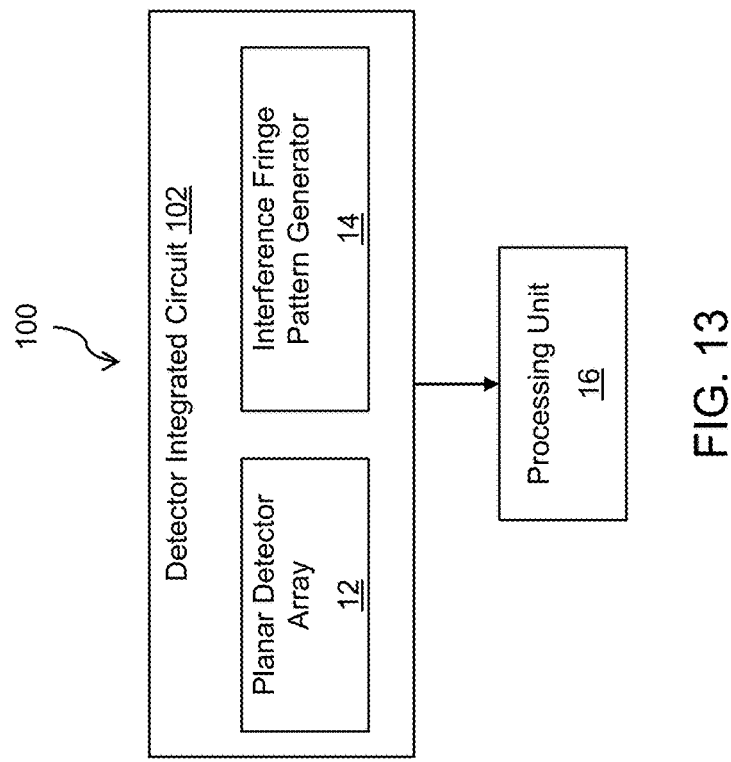
FIG. 13 is a schematic illustration of a small-scale compact spectrometry unit, according to an embodiment of the invention.

Refer now to FIG. 13, an embodiment of a small-scale compact spectrometry unit 100 for incorporation into a digital instrument or device, such as a mobile communication device (e.g., cellular phones, smart phones, tablets, etc.). The compact spectrometry unit 100 includes a detector integrated circuit 102, having the interference fringe pattern generator 14 deposited thereon. The detector integrated circuit 102 may be a commercial off the shelf (COTS) detector integrated circuit that includes a planar detector array 12, such as a commercially available CCD detector integrated circuit. The interference fringe pattern generator 14 may be deposited on the detector integrated circuit 102 via semiconductor manufacturing methods, such as, for example, deposition, etching and micro-lens imprinting methods.

Alternatively, the interference fringe pattern generator 14 may be deposited on the detector integrated circuit 102 during production manufacturing of the detector integrated circuit 102.

Preferably, the result of the depositing of the interference fringe pattern generator 14 on the detector integrated circuit 102 yields the interference fringe pattern generator 14 and the detector array 12 being kept under vacuum.

When incorporated into a mobile communication device, such as, for example, a smartphone, the compact spectrometry unit 100 may utilize the existing hardware and software infrastructure of the mobile communication device to perform the storing and processing functions of the processing unit 16. Alternatively, the detector integrated circuit 102 may including storage and processing capability, and as such, the processing unit 16 may be embedded within the detector integrated circuit 102, as an add-on chip or integrated circuit.

Further, the compact spectrometry unit 100 preferably utilizes additional infrastructure of the host mobile communication device to perform the operations to obtain the spectral characteristics of the object 24. Specifically, the compact spectrometry unit 100 may utilize the LED flash, common to most mobile communication devices, as the illumination source 30. In practice, in order to produce a focused beam of light (e.g., the light rays 32) to reflect off the region 27 of the object 24, a focusing lens (not shown) may be removably coupled to the output of the LED flash, or may be fixedly attached to the output of the LED flash.

Note that additional application software may be installed on the mobile communication device to facilitate the functionality of performing the spectral analysis operations of the compact spectrometry unit 100.

Implementation of the system and/or device of embodiments of the invention can involve performing or completing selected tasks manually, automatically, or a combination thereof. Moreover, according to actual instrumentation and equipment of embodiments of the system and/or device of the invention, several selected tasks could be implemented by hardware, by software or by firmware or by a combination thereof using an operating system.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system comprising:
    an illuminator for producing a beam of light rays having components of light in the visible region of the electromagnetic spectrum;
    a lens deployed at an output of the illuminator for focusing the beam so as to produce a focused illumination spot on an object such that light rays in the visible region of the electromagnetic spectrum are diffused by the object in response to the focused illumination spot, wherein the object is illuminated by background illumination and wherein the intensity of the focused illumination spot is at least one order of magnitude greater than the illumination intensity of the background illumination;
    an interference fringe pattern generator to form an interference fringe pattern from the light rays diffused by the object;

a planar array of detector pixels arranged to capture an image of the interference fringe pattern;

a storage medium coupled to the planar array of detector pixels, the storage medium recording information indicative of intensity values of the image of the interference fringe pattern captured by a selected group of pixels of the planar array of detector pixels, the information being recorded as a function of the optical path difference values traversed by the diffused light rays through the interference fringe pattern generator for each of the pixels in the selected group of pixels; and at least one processor coupled to the storage medium to determine the spectral characteristics of the object based on the information indicative of the intensity values recorded by the storage medium and the optical path difference values traversed by the diffused light rays.

2. The system of claim 1, wherein the interference fringe pattern generator is deployed between the planar array of detector pixels and the object.

3. The system of claim 1, wherein the interference fringe pattern generator includes:

a plano-convex lens having a planar surface parallel to the planar array of detector pixels, the planar surface being a closest surface of the plano-convex lens to the object, and a curved surface being a closest surface of the plano-convex lens to the planar array of detector pixels, and a gap formed in the space between the curved surface of the plano-convex lens and the planar array of detector pixels.

4. The system of claim 1, wherein the interference fringe pattern generator includes:

a plano-concave lens, the planar surface of the plano-concave lens being in a plane parallel to the planar array of detector pixels, and being a closest surface of the plano-concave lens to the planar array of detector pixels.

5. The system of claim 1, wherein the interference fringe pattern generator includes:

a prism having a first planar surface parallel to the planar array of detector pixels, the planar surface being a closest surface of the prism to the object, the prism having a second and a third planar surfaces, each extending away from the planar array of detector pixels towards the first planar surface, and a gap formed in the space between the second and third planar surfaces and the planar array of detector pixels.

6. The system of claim 1, wherein the interference fringe pattern generator includes:

a concave prism having a planar surface parallel to the planar array of detector pixels, the planar surface being a closest surface of the prism to the planar array of detector pixels.

7. The system of claim 1, wherein the interference fringe pattern generator includes:

a substantially flat slab parallel to the planar array of detector pixels having a linearly varying index of refraction.

8. The system of claim 1, wherein the planar array of detector pixels is implemented as a single two-dimensional detector array.

9. The system of claim 1, wherein the planar array of detector pixels is implemented as one or more linear one-dimensional detector arrays.

10. The system of claim 1, wherein the interference fringe pattern has circular symmetry.

11. The system of claim 1, wherein the interference fringe pattern has linear symmetry.

12. The system of claim 1, further comprising:

a collimating lens deployed between the interference fringe pattern generator and the object for collimating the light rays diffused by the object.

13. The system of claim 1, wherein the lens, the interference pattern fringe generator, the planar array of detector pixels, the storage medium, and the at least one processor are integrated in a mobile communication device, and wherein the illuminator includes a flash light source that is part of existing infrastructure of the mobile communication device.

14. A method comprising:

producing, by an illuminator, a beam of light rays having components of light in the visible region of the electromagnetic spectrum;

focusing, by a lens deployed at an output of the illuminator, the beam so as to produce a focused illumination spot onto an object such that light rays in the visible region of the electromagnetic spectrum are diffused by the object in response to the focused illumination spot, wherein the object is illuminated by background illumination and wherein the intensity of the focused illumination spot is at least one order of magnitude greater than the illumination intensity of the background illumination;

deploying an interference fringe pattern generator between a planar array of detector pixels and the object to form an interference fringe pattern from the light rays diffused by the object;

capturing an image of the interference fringe pattern by the planar array of detector pixels;

recording, by a storage medium, information indicative of intensity values of the image of the interference fringe pattern captured by a first selected group of pixels of the planar array of detector pixels as a function of the optical path difference values traversed by the diffused light rays through the interference fringe pattern generator for each of the pixels in the first selected group of pixels; and determining, by a processor, the spectral characteristics of the object based on the recorded information indicative of the intensity values and the optical path difference values traversed by the diffused light rays.

15. The method of claim 14, further comprising:

collimating the light rays diffused by the object.

16. The method of claim 14, further comprising:

recording, by the storage medium, intensity values associated with the image of the interference fringe pattern captured by a second selected group of pixels of the planar array of detector pixels as a function of the optical path difference values traversed by the diffused light rays through the interference fringe pattern generator for each of the pixels in the second selected group of pixels; and averaging the recorded intensity values associated with the image of the interference fringe pattern captured by the first and second selected groups of pixels.

17. The method of claim 14, wherein the interference fringe pattern includes a series of concentric rings, and wherein the selected group of pixels of the planar array of detector pixels includes pixels that are arranged in a line which passes through the center of the series of concentric rings.

18. The method of claim 14, wherein the interference fringe pattern includes a series of substantially parallel lines, and wherein the selected group of pixels of the planar array of detector pixels includes pixels that are arranged in a line substantially perpendicular to the series of substantially parallel lines.

19. The method of claim 14, further comprising: integrating the lens, the interference fringe pattern, the planar array of detector pixels, the storage medium, and the processor in a mobile communication device, and wherein the illuminator includes a flash light source that is part of existing infrastructure of the mobile communication device.

20. A compact spectrometer comprising:
- an illuminator for producing a beam of light rays having components in the visible region of the electromagnetic spectrum;
- a lens deployed at an output of the illuminator for focusing the beam so as to produce a focused illumination spot on an object such that light rays in the visible region of the electromagnetic spectrum are diffused by the object in response to the focused illumination spot, wherein the object is illuminated by background illumination and wherein the intensity of the focused illumination spot is at least one order of magnitude greater than the illumination intensity of the background illumination;
- a detector integrated circuit having a planar array of detector pixels embedded thereon and an interference fringe pattern generator deposited thereon, the interference fringe pattern generator forming an interference fringe pattern from the light rays diffused by the object, wherein the planar array of detector pixels are arranged to capture an image of the interference fringe pattern; and
- a processing unit operatively coupled to the planar array of detector pixels, the processing unit including at least one processor coupled to a storage medium, the storage medium recording information indicative of intensity values of the image of the interference fringe pattern captured by a selected group of pixels of the planar array of detector pixels, the information being recorded as a function of the optical path difference values traversed by the diffused light rays through the interference fringe pattern generator for each of the pixels in the selected group of pixels, and the at least one processor to determine the spectral characteristics of the object based on the information indicative of the intensity values recorded by the storage medium and the optical path difference values traversed by the diffused light rays.

21. The compact spectrometer of claim 20, wherein the processing unit is embedded in the detector integrated circuit.

22. The compact spectrometer of claim 20, wherein the lens, the detector integrated circuit, and the processing unit are integrated in a mobile communication device, and wherein the illuminator includes a flash light source that is part of existing infrastructure of the mobile communication device.

* * * * *